United States Patent
Tzirkel-Hancock et al.

(10) Patent No.: US 9,998,892 B2
(45) Date of Patent: Jun. 12, 2018

(54) DETERMINING VEHICLE USER LOCATION FOLLOWING A COLLISION EVENT

(71) Applicant: GM Global Technology Operations LLC, Detroit, MI (US)

(72) Inventors: Eli Tzirkel-Hancock, Ra'Anana (IL); Omer Tsimhoni, Ramat Hasharon (IL); Scott M. Reilly, Southfield, MI (US); Ilan Malka, Tel Aviv (IL)

(73) Assignee: GM Global Technology Operations LLC, Detroit, MI (US)

(*) Notice: Subject to any disclaimer, the term of this patent is extended or adjusted under 35 U.S.C. 154(b) by 156 days.

(21) Appl. No.: 14/966,648

(22) Filed: Dec. 11, 2015

(65) Prior Publication Data

US 2017/0171730 A1 Jun. 15, 2017

(51) Int. Cl.
| | | |
|---|---|---|
| G08B 1/08 | (2006.01) | |
| H04W 4/22 | (2009.01) | |
| G08G 1/127 | (2006.01) | |
| H04W 4/02 | (2018.01) | |
| G08G 1/00 | (2006.01) | |
| B60R 21/00 | (2006.01) | |
| B60R 21/013 | (2006.01) | |

(52) U.S. Cl.
CPC .............. *H04W 4/22* (2013.01); *G08G 1/127* (2013.01); *G08G 1/205* (2013.01); *H04W 4/023* (2013.01); *B60R 2021/0027* (2013.01); *B60R 2021/01315* (2013.01)

(58) Field of Classification Search
CPC ....... H04W 4/22; H04W 4/046; H04W 4/023; H04L 67/12; B60R 21/032; B60R 2021/0027; B60R 2021/01315

USPC .................................................... 340/539.13
See application file for complete search history.

(56) References Cited

U.S. PATENT DOCUMENTS

| | | | | |
|---|---|---|---|---|
| 5,808,564 A | * | 9/1998 | Simms | G08G 1/205 340/426.19 |
| 7,284,769 B2 | * | 10/2007 | Breed | B60R 21/0132 180/282 |
| 7,832,762 B2 | * | 11/2010 | Breed | B60R 21/0132 280/728.1 |
| 8,189,825 B2 | * | 5/2012 | Breed | H04R 5/02 381/302 |
| 9,099,000 B2 | * | 8/2015 | Schalk | H04W 4/023 |
| 9,102,220 B2 | * | 8/2015 | Breed | B60R 21/0132 |
| 9,751,534 B2 | * | 9/2017 | Fung | B60W 40/08 |
| 9,809,196 B1 | * | 11/2017 | Penilla | H04N 7/181 |
| 2009/0190735 A1 | * | 7/2009 | Gilmartin | B60R 16/0373 379/201.12 |
| 2014/0303807 A1 | * | 10/2014 | Addepalli | H04W 4/046 701/1 |

(Continued)

Primary Examiner — John A Tweel, Jr.
(74) Attorney, Agent, or Firm — David Willoughby; Reising Ethington P.C.

(57) ABSTRACT

A system for identifying a location of a vehicle user following a collision event and a method of using the system that includes the steps of: receiving an indication of the vehicle collision event at a backend system, wherein the indication is displayed as a graphical user interface; receiving a command at the backend system using the graphical user interface, wherein the command is associated with identifying the location of the vehicle user at a vehicle; and transmitting the command to the vehicle for the vehicle to carry out the command.

17 Claims, 5 Drawing Sheets

(56) References Cited

U.S. PATENT DOCUMENTS

2014/0309934 A1\* 10/2014 Ricci .................... H04W 48/04
                                                                  701/537

\* cited by examiner

DETERMINING VEHICLE USER LOCATION FOLLOWING A COLLISION EVENT

TECHNICAL FIELD

The present invention relates to determining a location of a vehicle user following a vehicle collision.

BACKGROUND

Seat weight sensors may be used to determine a location of an automotive vehicle occupant. However, following a vehicle accident, the occupant may be dislocated from the vehicle seat; thus, the sensor may not adequately identify the occupant's location following the accident. Thus, there is a need to determine the occupant's location post-accident, particularly in telematics equipped vehicles which may enable the occupant to speak with emergency service personnel.

SUMMARY

According to an embodiment of the invention, there is provided a method of determining a location of a vehicle user following a vehicle collision event. The method includes the steps of: receiving an indication of the vehicle collision event at a backend system, wherein the indication is displayed as a graphical user interface; receiving a command at the backend system using the graphical user interface, wherein the command is associated with identifying the location of the vehicle user at a vehicle; and transmitting the command to the vehicle for the vehicle to carry out the command.

According to another embodiment of the invention, there is provided a method of determining a location of a vehicle user following a vehicle collision event. The method includes the steps of: associating a vehicle communication device with a mobile device associated with the user; receiving an indication of the vehicle collision event at the communication device; receiving an audio input at the communication device via one or more vehicle microphones, the audio input being associated with an audible sound emitted from the mobile device which is associated with the received indication of the vehicle collision event at the communication device; and determining the location of the user using the audio input.

According to another embodiment of the invention, there is provided a method of establishing communication with a vehicle user following a vehicle collision event. The method includes the steps of: receiving one or more location data inputs at a vehicle communication device in a vehicle; using the one or more location data inputs at the communication device, determining a first location of the user; storing location parameters associated with the first location in memory of the communication device; receiving an indication of the vehicle collision event at the communication device; receiving at least one additional location data input at the communication device; in response to receiving the indication, determining a second location of the user using the stored location parameters and the at least one additional location data input; and facilitating an establishment a cellular communication link between a data service center and the user at the second location.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to identifying a location of a vehicle user or occupant following a vehicle collision event. A vehicle communication device and one or more vehicle sensors may be used to determine the location of the user prior to the event, and then one or more vehicle sensors are used to determine the user's location following the collision event. The pre-collision location information may be stored in device memory and be used in at least part of a post-collision location determination. In some implementations, a mobile device (e.g., one capable of short range wireless communication) may be used to identify the user's position prior to and/or following the collision event. As will be explained below, in at least one embodiment, the mobile device may emit an audible sound which may provide input to one or more microphones located in the vehicle; these inputs may be used by the communication device to determine the post-collision location of the user. The method may include thereafter establishing voice communication (e.g., via a cellular link) between the user and a remotely located data service center (e.g., such as a vehicle call center). The speech quality of the voice communication may be improved using speech enhancement and noise suppression techniques even when the user may be in a noisy environment (e.g., following a vehicular accident).

In addition, the method may include displaying vehicle and vehicle user information to a live advisor at a telematics backend system—e.g., so that the live advisor may determine a suitable course of action. In at least one embodiment, based on the displayed information, the live advisor may use the displayed Smartphone information to make a call to one or more Smartphones and to select from the backend system one or more user regions within the vehicle cabin and thereby focus or isolate the audio in that/those region(s).

Communications System—

Figure 1:
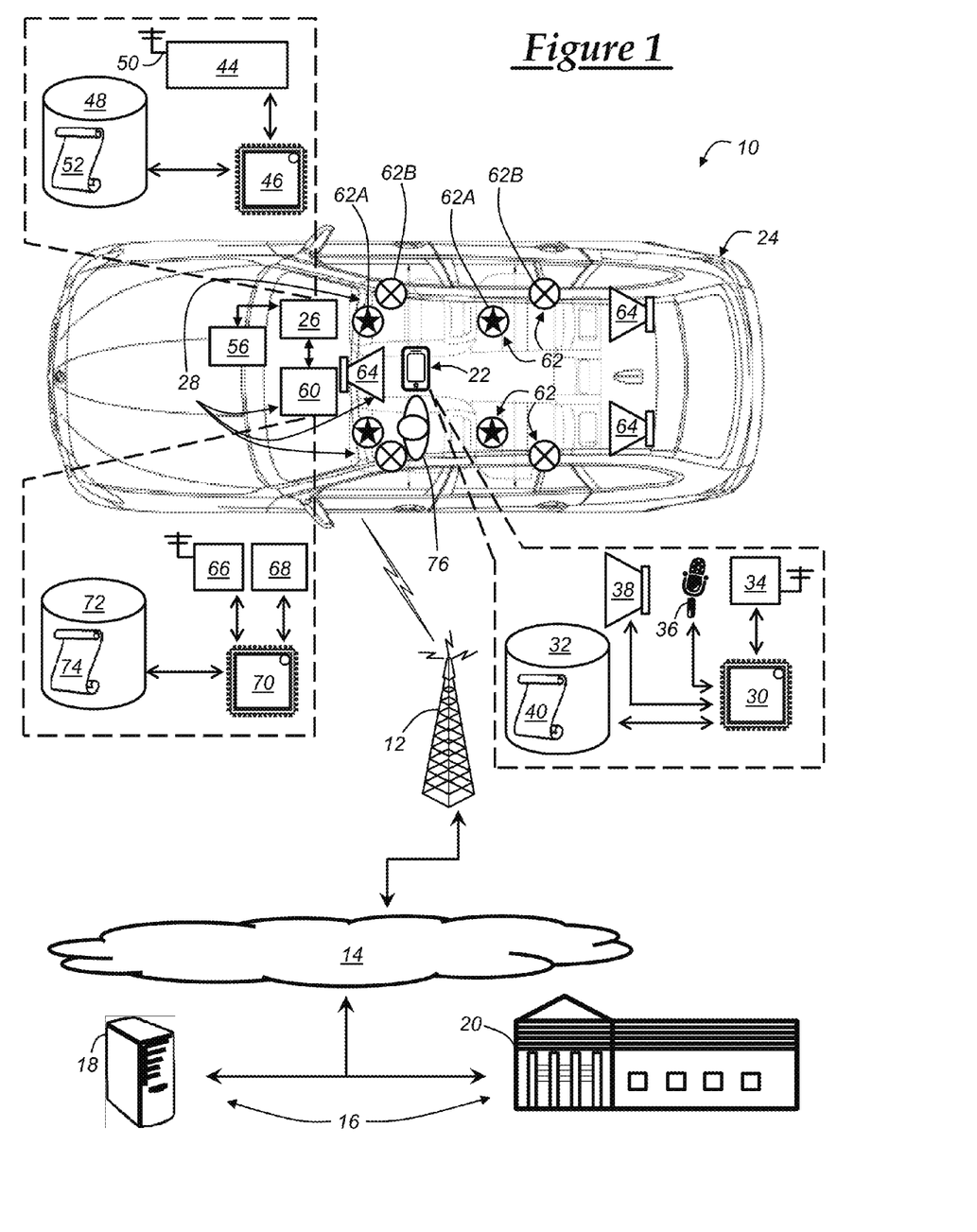
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; and a vehicle 24 comprising a vehicle telematics unit 26 and an audio system 28. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only one is shown), one or more mobile switching centers (MSCs) (not shown), as well as any other networking components required to connect wireless carrier system 12 with land network 14. For example, in GSM systems, each cell tower can include sending and receiving antennas and a base station, with the base stations from different cell towers being connected to the MSC either directly or via intermediary equipment such as a base station controller. It should be appreciated that cellular system 12 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 12, a different wireless carrier system in the form of satellite communication can be used to provide uni-directional or bi-directional communication with the vehicle. This can be done using one or more communication satellites and an uplink transmitting station (not shown). Uni-directional communication can be, for example, satellite radio services, wherein programming content (news, music, etc.) is received by transmitting station, packaged for upload, and then sent to the satellite, which broadcasts the programming to subscribers. Bi-directional communication can be, for example, satellite telephony services using satellite to relay telephone communications between the vehicle 24 and uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 (and other like vehicles) with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

An optional mobile device 22 (shown with the vehicle cabin) includes any electronic device which may be capable of cellular voice and/or data calls across a wide geographic area where transmissions are facilitated by the wireless carrier system 12. For example, it may be configured to provide cellular services according to a subscription agreement with a third-party facility such as a wireless service provider (WSP). In addition, mobile device 22 may be electronically coupled to the vehicle 24 by wire or wirelessly via short-range wireless communication (SRWC) (such as any of the IEEE 802.11 protocols, WiMAX, ZigBee™, Wi-Fi direct, Bluetooth, near field communication (NFC), etc.).

As shown in FIG. 1, mobile device 22 may include a user interface coupled to a processor 30 configured to execute an operating system (OS) stored on mobile device memory 32 (e.g., a non-transitory computer readable medium of the device). Additional components may include a wireless chipset 34 (for short range wireless communication, cellular communication, or both), a microphone 36, and at least one audio speaker 38. The processor 30 further may execute one or more software applications 40 stored in device memory 32 as well. Using such applications, a vehicle user may remotely control or communicate with vehicle 24 or the backend system 16 (e.g., via cellular communication, SRWC, or both). For example, a software application may enable the user to remotely lock/unlock vehicle doors, turn the vehicle on/off, check the vehicle tire pressures, fuel level, oil life, etc. According to another software application embodiment, application 40 may perform at least some of the method steps described herein—e.g., it may control the speaker 38 and access an audio library (or the like) stored in device memory 32 so that, when commanded or instructed by another device (e.g., the telematics unit 26, the audio system 28, a computer at the data service center 20, etc.), the mobile device 22 may emit an audible sound to assist a vehicle communication device (e.g., an onboard vehicle computer) in locating an associated user following a vehicle collision event, which will be described in greater detail below.

Non-limiting examples of the mobile device 22 include a cellular telephone, a personal digital assistant (PDA), a Smart phone, a personal laptop computer or tablet computer which may or may not have two-way communication capabilities, a netbook computer, a notebook computer, or any suitable combinations thereof. The mobile device 22 may be used inside or outside of vehicle 24 by the vehicle user who may be a vehicle driver or passenger. It should be appreciated that the user does not need to have ownership of the mobile device 22 or the vehicle 24 (e.g., the vehicle user may be an owner or a licensee of either or both).

Vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include a number of electronic devices including the telematics unit 26, the audio system 28, multiple vehicle sensors (not shown), and multiple other vehicle system modules (VSMs) for controlling or regulating various vehicle subsystems. The telematics unit 26, audio system 28, sensors, and VSMs may be interconnected or electrically coupled by one or vehicle communication networks (e.g., by a wired link (e.g., a bus or discrete wiring) or a wireless link (e.g., using one or more forms of short range wireless communication, similar to those described above)).

Telematics unit 26 can be an OEM-installed (embedded) or aftermarket device that is installed in the vehicle and that enables wireless voice and/or data communication over wireless carrier system 12 and via wireless networking. The telematics unit 26 may be connected to the audio system (microphones and loudspeakers) and include Bluetooth to connect to Smartphones. This enables the vehicle 24 to communicate with data service center 20, other telematics-enabled vehicles (not shown), or some other entity or device (such as mobile device 22). The telematics unit preferably uses radio transmissions to establish a communications channel (a voice channel and/or a data channel) with wireless carrier system 12 so that voice and/or data transmissions can be sent and received over the channel. By providing both voice and data communication, telematics unit 26 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data service center 20) and data communication (e.g., to provide GPS location data or vehicle diagnostic data to the data service center 20), the system can utilize a single call over a voice channel and switch as needed between voice and data transmission over the voice channel, and this can be done using techniques known to those skilled in the art. Cellular communication using the telematics unit 26 may be carried out over the wireless carrier system 12 using a wireless service provider (WSP); and it should be appreciated that the WSP associated with the telematics unit 26 need not be the same WSP associated with the mobile device 22.

According to one embodiment, telematics unit 26 utilizes cellular communication according to either GSM, CDMA, or LTE standards and thus includes a wireless chipset 44 (e.g., for cellular and/or SRWC communication) for voice communications like hands-free calling, a wireless modem (not shown) for data transmission, an electronic processing device or processor 46, one or more digital memory devices 48, and an antenna 50. It should be appreciated that the modem can either be implemented through application software 52 that is stored in the telematics unit memory 48 and executed by processor 46, or it can be a separate hardware component located internal or external to telematics unit 26. The modem can operate using any number of different standards or protocols such as LTE, EVDO, CDMA, GPRS, and EDGE. Wireless networking between the vehicle and other networked devices can also be carried out using telematics unit 26. For this purpose, telematics unit 26 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 26 can be configured with a static IP address or can set up to automatically receive an assigned IP address from another device on the network such as a router or from a network address server.

Processor 46 can be any type of device capable of processing electronic instructions including microprocessors, microcontrollers, host processors, controllers, vehicle communication processors, and application specific integrated circuits (ASICs). It can be a dedicated processor used only for telematics unit 26 or can be shared with other vehicle systems (e.g., such as the audio system 28). Processor 46 executes various types of digitally-stored instructions, such as software or firmware programs stored in memory 48, which enable the telematics unit to provide a wide variety of services. For instance, processor 46 can execute programs or process data to carry out at least a part of the method discussed herein.

The memory 48 may include computer usable or non-transitory computer readable medium, which includes one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Telematics unit 26 can be used to provide a diverse range of vehicle services that involve wireless communication to and/or from the vehicle. Such services include: turn-by-turn directions and other navigation-related services that are provided in conjunction with a GPS-based vehicle navigation module (not shown); airbag deployment notification and other emergency or roadside assistance-related services that are provided in connection with one or more collision sensor interface modules 56 such as a body control module; diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 26, but are simply an enumeration of some of the services that the telematics unit is capable of offering. Furthermore, it should be understood that at least some of the aforementioned modules could be implemented in the form of software instructions saved internal or external to telematics unit 26, they could be hardware components located internal or external to telematics unit 26, or they could be integrated and/or shared with each other or with other systems located throughout the vehicle, to cite but a few possibilities. In the event that the modules are implemented as VSMs located external to telematics unit 26, they could utilize a communication network to exchange data and commands with the telematics unit.

Audio system 28 includes a vehicle infotainment system (VIS) module 60 connected to one or more microphones 62 and one or more audio speakers 64. VIS module 60 may comprise a user interface for input/output (I/O) (not shown), a SRWC chipset 66, a speech processing module 68, one or more processors or processing devices 70, and one or more memory devices 72—just to name a few components. SRWC chipset 66 enables VIS module 60 to connect with portable devices such as mobile device 22 (e.g., using any suitable SRWC link; e.g., Wi-Fi, Wi-Fi Direct, Bluetooth, NFC, etc.). Speech processing module 68 includes hardware (e.g., circuitry), software, or a combination thereof that enables enhancement of user speech and suppression of noise (e.g., cabin noise, ambient vehicle noise, and even the speech of other vehicle passengers, just to name a few examples). The speech processing module 68 may utilize a variety of techniques known to skilled artisans including filtering, speech/non-speech recognition, etc.

Embodiments of the one or more processors 70 and memory 72 (of VIS module 60) may be of similar type and may have similar characteristics and qualities as that of processor(s) 46 and memory 48 (of telematics unit 26), and therefore will not be explained here in great detail. For example, memory 72 also may be a non-transitory computer readable medium. However, it will be appreciated that processor 70 and memory 72 may be specially adapted to carry out the processes and methods associated with VIS module 60 (rather than the telematics unit 26). And again, in at least one embodiment, the processor(s) 70 and memory 72 may execute one or more steps of the method embodiments contemplated herein. For example, the method(s) may be performed as one or more computer programs executable by one or more computing devices of or in communication with the VIS module 60 to cause the VIS module and/or its respective computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files.

A number of microphones 62 in the audio system 28 are illustrated (e.g., in one embodiment, at least two microphones are located proximate to each seat position). This is merely an example and other arrangements are contemplated. In at least one embodiment, some of the microphones are hands-free (HF) microphones 62A and some are active noise-canceling (ANC) microphones 62B (FIG. 1 illustrates pairing having one of each; however, this also is only an example). As will be described in greater detail below, the microphones 62 may be utilized as vehicle sensors (e.g., sensors used to determine the location of the vehicle user). HF microphones 62A may be bi-directional, omni-directional, or any other suitably directional microphone adapted to the size and shape of the cabin interior, user seating locations, vehicle components and their respective spatial orientations within the cabin, cabin sound insulation materials, etc. ANC microphones 62B are configured to filter ambient noise from the desired sound received via the HF microphones 62A; ANC microphones 62B and the techniques used to implement them are generally known to skilled artisans. The speakers 64 also may be conventional; three are shown; however, this is merely an example. For example, more or less speakers also may be used.

FIG. 1 illustrates a single vehicle user 76; however, one or more additional occupants may be present in the vehicle 24. Further, in at least one embodiment, the speech of an additional occupant may be filtered-out or isolated so that speech from user 76 may be received and comprehended by a computer 18 or live advisor (at data service center 20)—e.g., following a vehicle collision event.

Method—

Figure 2A:
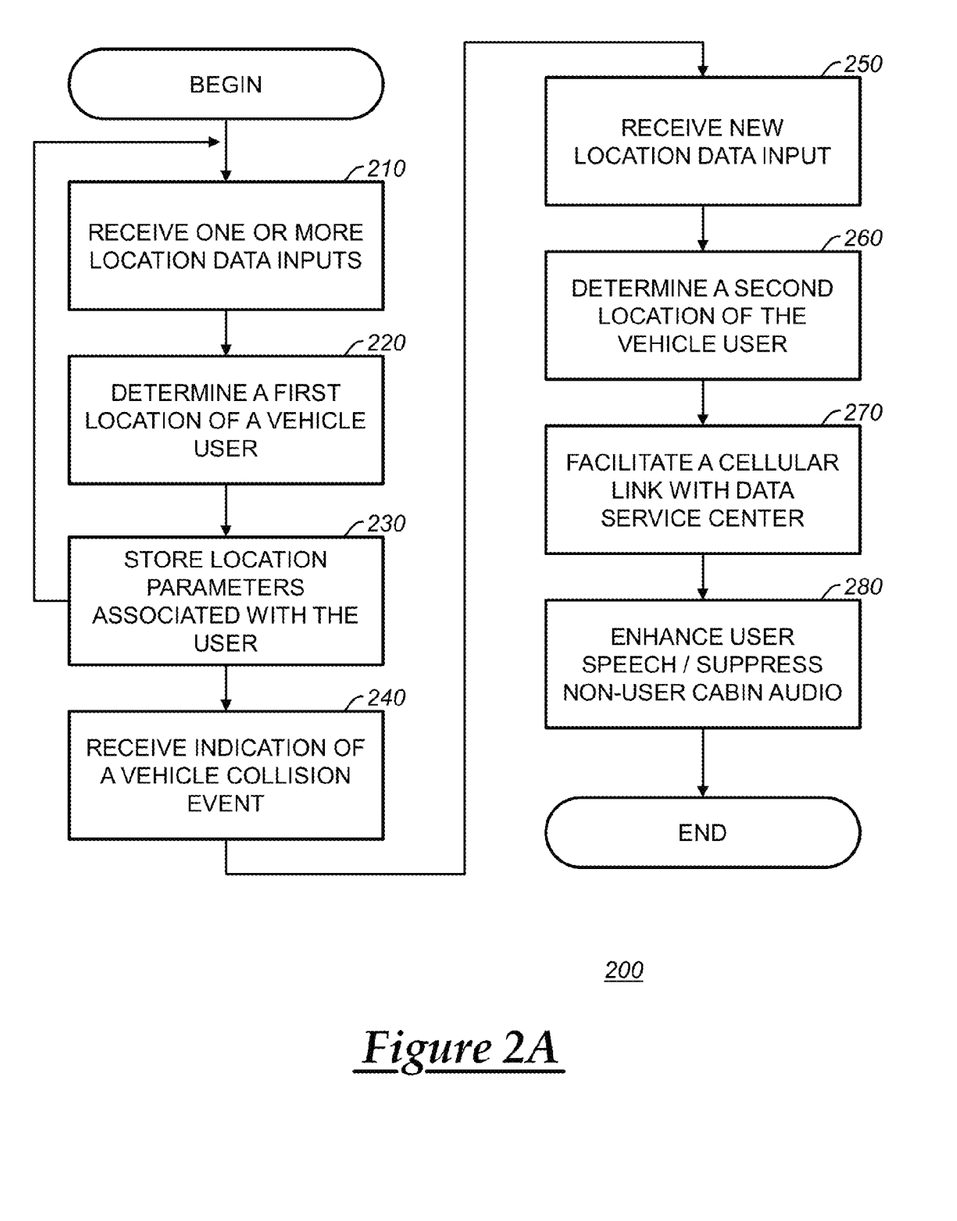
FIG. 2A illustrates a flow diagram of a method of establishing communication with a vehicle user following a vehicle collision event.
Figure 2B:
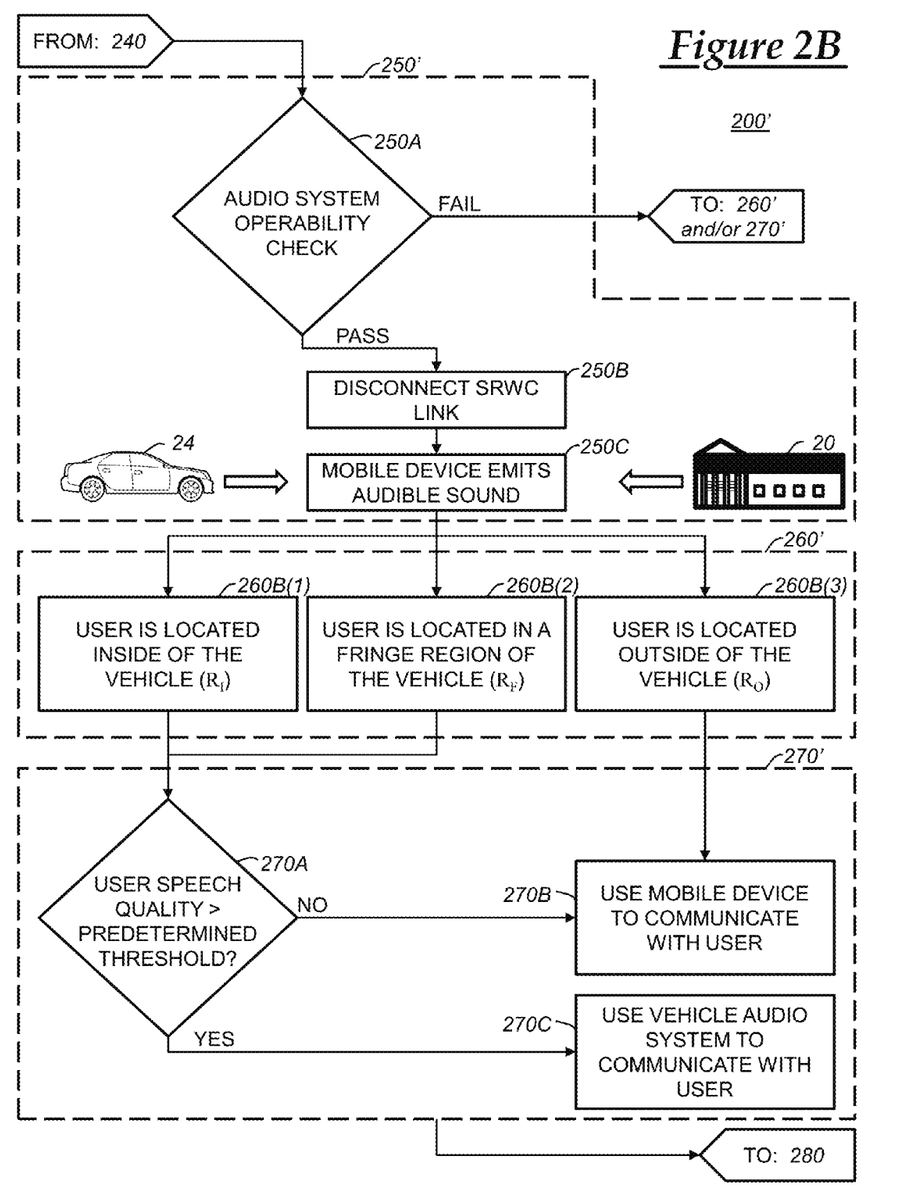
FIG. 2B illustrates another embodiment of the method shown in FIG. 2A.

Turning now to FIGS. 2A-2B, there is shown a method 200 for establishing communication with vehicle user 76 following a vehicle collision event. The method begins with step 210 wherein one or more location data inputs are received at a vehicle communication device. As used herein, the vehicle communication device includes the telematics unit 26, the VIS module 60, or both. Location data inputs include any suitable electronic data received from one or more vehicle sensors in vehicle 24. Non-limiting examples of vehicle sensors which may be adapted to provide location data include vehicle seat (pressure) sensors, seatbelt sensors, proximity sensors, in-vehicle cameras, and the like. According to at least one embodiment, the location data input further includes SRWC data between the communication device and the mobile phone 22. For example, skilled artisans will appreciate techniques involving wireless signal strength, signal transmission time, etc. may be used to determine the proximity of the mobile device 22 to an antenna associated with the communication device. Thus, when the mobile device 22 is presumed to be located relatively close to the vehicle user 76, this SRWC data may further be used to determine the location of the vehicle user. In addition, in at least one embodiment, input from the audio system 28—received from two or more microphones 62 (e.g., caused by speech from user 76)—may be used by the communication device to determine the user's location in the vehicle 24 (e.g., time difference of arrival (TDOA), triangulation, and other location detecting techniques using audio from two or more microphones is known to skilled artisans). Thus, location data input may include user-speech audio signals as well. These various location data inputs may be used singly or in any suitable combination with one another in order to determine the user's location in vehicle 24. And method 200 may be used for any number of vehicle users. The description below describes enhancing speech audio from user 76; however, these same techniques may be used to enhance speech audio from other users as well.

It will be appreciated that in order to utilize SRWC between the mobile device 22 and the vehicle communication device (and determine location data input therefrom), a SRWC link or connection may need to be formed first. At least according to one example, the communication device and mobile device 22 may pair according to a Bluetooth protocol (of course, this is merely an example and other SRWC protocols also may be used). Having established the SRWC link, in at least one implementation, the mobile device 22 may provide the communication device an identifier associated with the mobile device. In one non-limiting example, the identifier could be a subscriber identity module identifier or SIM-ID. As will be discussed more below, the identifier may be used by the telematics unit 26 to determine a mobile telephone number of device 22 (e.g., by querying a wireless service provider (WSP) or mobile network operator (MNO), or by querying the data service center 20, which may have previously associated the mobile device 22 with vehicle 24 and stored the telephone number or which may contact the WSP or MNO). Regardless of how the identifier of the mobile device 22 is obtained, having established the SRWC, the mobile device 22 and communication device may carry out a variety of wireless interactions and the communication device may receive SRWC data suitable for determining the relative proximity (and location) of the mobile device (e.g., signal strength data, transmission latency data, etc.). Following step 210, the method proceeds to step 220.

In step 220, the location data inputs received in step 210 may be used to determine the actual or approximate position of the vehicle user 76. For example, the communication device may determine a first or pre-collision position of user 76 using application software (e.g., 52, 74, or both) installed in memory (e.g., 48, 72, or both) which may be executed by processor (e.g., 46, 70, or both). In response to the execution of this software, the processor (e.g., 46, 70, or both) may determine location parameters associated with the pre-collision position; e.g., that the user is located in the driver's seat (as shown in FIG. 1), the front passenger seat, one of two or more rear passenger seats, etc. In at least one embodiment, identifying the location of mobile device 22 may also presume to identify the location of its user 76 (or at least be evidence of the user's location to be used by software (52,74, or both) in determining the pre-collision position).

After determining the pre-collision position (step 220), location parameters associated with the position may be stored in memory (step 230) (e.g., memory 48, 72, or both). It is contemplated that in some implementations, the 210, 220, and 230 may be repeated (e.g., periodically or otherwise); thus, the pre-collision location parameters may be updated. Following step 230, the method 200 may proceed to step 240.

In step 240, the vehicle 24 may experience a collision event. Data indicative of the event may be received at the communication device from one or more vehicle sensors or modules. For example, as discussed above, the body control module (BCM) 56 may provide an electrical output to the communication device via a vehicle communication network. The phrase 'collision event' should be construed broadly to include any suitable emergency event in which the occupants of vehicle 24 could be harmed, displaced from their respective locations within vehicle 24, or both. Thus, collision events include objects (including but not limited to other vehicles) impacting vehicle 24, as well as vehicle 24 impacting other objects and/or vehicles. Following step 240, the method proceeds to step 250.

In step 250, new, additional, or post-collision location data input is received. One or more of the previously discussed sources (e.g., discussed with respect to step 210) may provide these input(s)—including, but not limited to, the vehicle sensors, the microphones 62, the mobile device 22, etc. Thereafter, method 200 proceeds to step 260.

Figure 3:
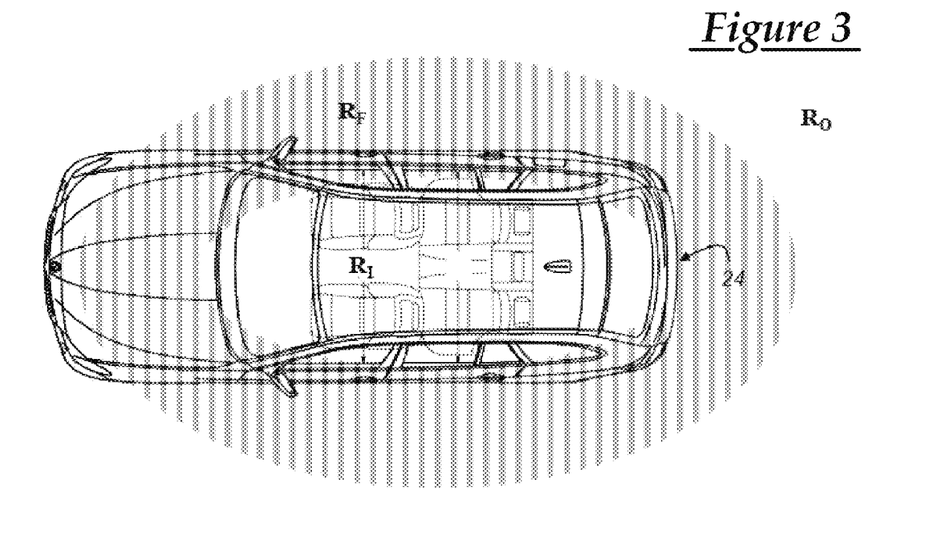
FIG. 3 illustrates an in-vehicle region, an out-of-vehicle region, and a fringe region where a vehicle user may be located following a collision event.

In step 260, the communication device uses the pre-collision location parameters and the location parameters associated with the post-collision location data input(s) to determine the location of the vehicle user. FIG. 3 illustrates three general regions in which the vehicle user 76 may be post-collision—e.g., user 76 may be an in-vehicle location ($R_I$), an out-of-vehicle location ($R_O$), or a fringe location ($R_F$). The in-vehicle location ($R_I$) includes being entirely within the vehicle cabin or interior. The out-of-vehicle location ($R_O$) includes being entirely outside of the vehicle cabin. The fringe location ($R_F$) includes instances where the user 76 is partially within and partially without the vehicle cabin. In fringe regions ($R_F$), the audio system 28 may or may not be suitable for voice communication (e.g., with a live advisor over at the data service center 20) e.g., due to environmental noise, obstructions by vehicle components or objects involved in the collision, etc. Similarly, when the user 76 is now located at the out-of-vehicle location ($R_O$), the audio system 28 may not adequately receive user speech.

Within each general region $R_I$, $R_O$, $R_F$, the communication device may determine a more precise location using the pre- and post-collision location parameters. By way of example, assume that the pre-collision location parameters indicate user 76 was in the driver's seat and post-collision location parameters indicate that the user 76 is a fringe region ($R_F$). Additional sensors (e.g., seat pressure sensors, seatbelt sensors, camera sensors, and even microphone 62) may be used to determine the more precise post-collision location parameters. For example, after the collision event, the driver's seat pressure sensor may indicate 'no driver present,' the driver's seatbelt sensor may indicate 'no seatbelt fastened,' a camera sensor may indicate the user 76 vehicle-forward of the steering wheel, and microphones may receive speech from user 76 in a region forward of the driver's seat. These are merely examples; and other sensor inputs are possible. Further, other vehicle sensor data (e.g., data from BCM 56) may indicate direction and speed of vehicle 24 prior to the collision event as well as direction and magnitude of the forces which acted on vehicle 24 at impact. For example, BCM 56 may indicate a head-on or frontal collision of vehicle 24; this data may be used with post-collision location data to determine the location of vehicle user 76. It will be appreciated that in some instances, the first and second user locations may be the same, while in other instances, the first and second user locations may differ (as in the illustrative example above).

It should be appreciated that determination of the user location post-collision event may include determining and using one or more probabilities (e.g., probabilities based on the variously-used location data). Following step 260, method 200 proceeds to step 270.

In step 270, the communication device facilitates a cellular link between the data service center 20 and the user 76 in response to detection of the collision event. When, for example, the user 76 is within the vehicle cabin ($R_I$), the communication device may utilize the audio system 28 and telematics unit 26 to enable a hands-free event. For example, the user may initiate or the data service center 20 may initiate a voice call between the center 20 and vehicle 24. Thereafter, the user, who may be at least partially incapacitated, may engage in the voice call with a live advisor at the center 20. During the voice call and using an interface like the one shown in FIG. 5, the live advisor may determine the collision circumstances including the vehicle's location, the need for emergency services (e.g., police, paramedics, fire department, tow-truck, etc.), and the need for any special medical attention for the user 76 or other occupants. When, for example, the user 76 is at the out-of-vehicle location ($R_O$), the communication device may utilize the mobile device 22 of the user to establish a cellular link. For example, in at least one embodiment, the data service center 20, having stored the mobile telephone number previously, may call the mobile device 22 following the telematics unit 26 reporting (to the center 20) the collision event and that the post-collision location of the user is outside the vehicle 24. When, for example, the user is in the fringe region ($R_F$), the communication device may determine whether the user-speech quality or audio quality from user 76 is greater than a predetermined threshold (e.g., considering one or more factors such as signal strength, noise, etc.). When the user-speech quality is less than or equal to the predetermined threshold, the data service center 20 may engage in cellular communication via the mobile device 22, as described above. And when the quality is greater than the predetermined threshold, the data service center 20 may engage in cellular communication via the vehicle audio system 28, as described above.

Figure 4:
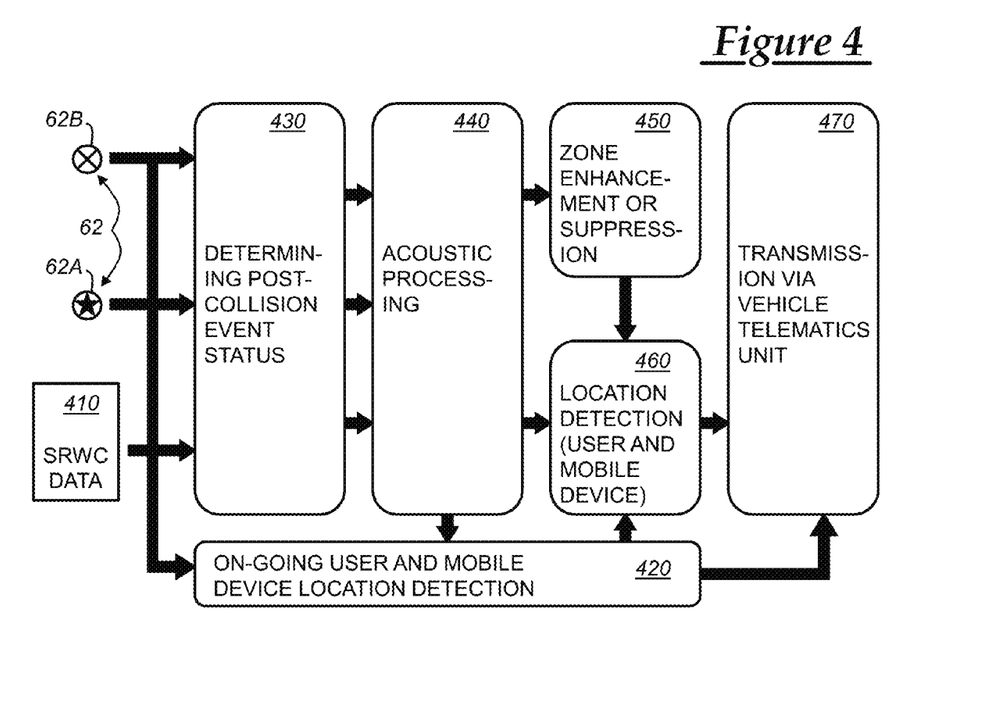
FIG. 4 illustrates a flow diagram of a method of enhancing speech audio in a vehicle prior to and following a collision event and location detection of occupants and mobile devices.

In step 280, any speech received from the user 76 via the audio system 28 (e.g., regardless of the user's post-collision location) may be enhanced. FIG. 4 illustrates an embodiment of enhancing speech audio—illustrating both pre-collision (step 420) and post-collision (steps 430-470). As illustrated, the communication device may receive electrical input data associated with microphones 62 (e.g., 62A, 62B, or both) and SRWC data based on the SRWC link 410 between the mobile device 22 and the communication device. This input data, among any other suitable input data, may be used by the communication device for on-going location detection of the user and the user's associated mobile device 22 (420). Following the collision event, the input data received by the communication device may be used to determine a post-collision status (430); e.g., an audio system operability check may be performed which includes determining which microphones 62 and speakers 64 are operational and whether the SRWC link 410 still exists. Presuming the audio system operability check passes, the communication device may perform acoustic processing (440); e.g., equalize microphones 62 of different types (62A, 62B, etc.) or equalize microphones 62 based on the collision conditions or user location, and/or perform acoustic echo cancellation for one or more microphones (just to name a few examples). In some implementations, the operability check does not need 100% operability (or full-operability); e.g., partial operability may 'pass' (such conditions may be preconfigured at the communication device).

According to one embodiment of step 450, the communication device may perform cabin zone speech enhancement or noise suppression (e.g., using techniques of microphone selection, beamforming, etc.) to amplify user speech audio, filter or otherwise decrease ambient noise from the vehicle 24, other occupants, the environment, etc. Step 450 may include opening or closing one or more vehicle windows to improve the speech audio from the user 76 to be sent via cellular transmission. In another embodiment, step 450 is performed by the data service center 20 (e.g., following establishment of the cellular link, step 470 below); e.g., a computer or live advisor at data service center 20 may selectively control zone speech enhancement and/or cabin noise suppression. In addition, some of these techniques may be utilized in step 460 in determining the post-collision location parameters of user 76 (e.g., including but not limited to opening and/or closing one or more vehicle windows).

Step 460 in FIG. 4 determines the post-collision location parameters of user 76 (described partially in step 260 above) and further includes additional location determination of the mobile device 22. Here, the location of the mobile device 22 is presumed to be proximate to the user 76. Location detection of device 22 may include repeating the techniques using the SRWC data (described above) or may include receiving an audible sound from mobile device 22 and detecting its location using microphones 62, as will be described in greater detail below. At least a portion of the data received and/or determined in steps 420-460 may be sent via the telematics unit 26 to the data service center 20 so that emergency services may be provided to vehicle 24 and user 76.

Other embodiments also exist. For example, different embodiments of steps 250, 260, and 270 (of FIG. 2A) are illustrated in FIG. 2B (shown as method 200'). In one embodiment, steps 250', 260', and 270' are performed; and in other embodiments only one or two of these steps are performed with method 200. In step 250', following receipt of the indication of the vehicle collision event in step 240, the communication device may perform the audio system operability check (step 250A) (similar to that described above). If the operability check fails, the method 200' may proceed to step 260' using one or more sensors (e.g., other than the microphones 62) to determine the user's post-collision location and then proceed to step 270C (establishing a cellular link directly with the mobile device 22), which is discussed below. Or based on the failure of the operability check, the method may skip step 260' and proceed directly to step 270C.

When in step 250A, the operability check determines at least partial operability (e.g., a 'pass') (i.e., the microphones 62, speakers 64, or both are at least partially operable with the VIS module 60), the method 200' may proceed to step 250B. In step 250B, the communication device may terminate or disconnect the SRWC link established between the vehicle 24 and the mobile device 22. While step 250B may not be required in all embodiments, disconnecting the SRWC link may be necessary for the mobile device 22 to ring in at least some circumstances (e.g., ring as a telephone).

In step 250C (which may follow step 250B), a call may be placed to mobile device 22 by the telematics unit 26 in vehicle 24 or by the data service center 20. An audible sound (e.g., a ringtone or the like) may be emitted by the device 22 as a result of the call. As will be described below, this sound may be used to determine the location of the mobile device 22 (and by implication, the user 76). It should be appreciated that other means exist for prompting the mobile device 22 to emit an audible sound. For example, application software 40 installed on mobile phone 22 may be configured to cooperate with vehicle 24—e.g., more specifically with the telematics unit 26 or VIS module 60. Following the detected collision event, a data or voice call may be initiated to the mobile device 22 instructing the software application 40 to emit any predetermined audible sound (e.g., even when the volume of the mobile device 22 is muted or otherwise set to 'silent'; e.g., the audible sound may be emitted only in an emergency mode). In addition, the volume or magnitude of the audible sound may be predetermined (and in some instances, may scale louder and louder—e.g., until the device is detected). In other implementations where step 250B has been omitted or skipped, the instruction to emit an audible sound may be received at mobile device 22 via the SRWC link (e.g., from the telematics unit 26 or VIS module 60). In addition, the instruction may include repeating the audible sound (e.g., periodically), if desired. Following step 250', the method 200' may proceed to step 260'.

Step 260' illustrates sub-steps 260B(1), 260B(2), and 260B(3), wherein the user 76 is located inside of the vehicle ($R_I$), in the fringe region ($R_F$), or outside of the vehicle ($R_O$), respectively. In at least one implementation, the audible sound emitted from the mobile device 22 (step 250C) may be used to determine the general region and/or the more specific location parameters of user 76 (e.g., again presuming the mobile device 22 is located proximate the user 76 following the collision event). For example, at least one microphone 62 may receive the audible sound, convert it to electrical location data input, and thereafter, the communication device may use that input to determine the location parameters of the mobile device 22 (and consequently or presumably, the user 76). Step 260' additionally may include other techniques described above (e.g., in step 260, FIG. 2A).

FIG. 2B illustrates one embodiment of step 270' in greater detail. For example, when the user 76 is determined to be inside ($R_I$) of the vehicle 24 (step 260B(1)) or in the fringe region ($R_F$) (step 260B(2)), the method may proceed to step 270A. And when the user is determined by the communication device to be outside ($R_O$) the vehicle 24 (step 260B(3)), the method may proceed to step 270B. In step 270A, if the user speech quality is less than or equal to a predetermined threshold, then the method proceeds to step 270B, whereas if the user speech quality is greater than to the threshold, then the method proceeds to step 270C. The user speech quality may be determined similarly to that described in step 270, FIG. 2A above.

In step 270B, the mobile device is used to communicate with the user 76 (e.g., a voice call between the data service center 20 and the mobile device 22 may be established—e.g., initiated by the center 20 in some instances). Or, if the SRWC link remains intact (e.g., step 250B was skipped), then the mobile device 22 (and user 76) may communicate with the data service center 20 via the telematics unit 26 using audio system 28. For example, mobile device 22 may be connected to telematics unit 26 (via SRWC link) and telematics unit 26 may be connected to data service center 20 (via a cellular link). Thus, in at least one embodiment, the communication system may selectively determine whether to communicate via the vehicle audio system 28 (microphones 62 and speakers 64) or via the mobile device 22 (microphone 36 and speaker 38). This may be particularly desirable when the user 76 is determined to be in the fringe region ($R_F$). Following step 270', the method 200' may proceed to step 280 (FIG. 2A).

Figure 5:
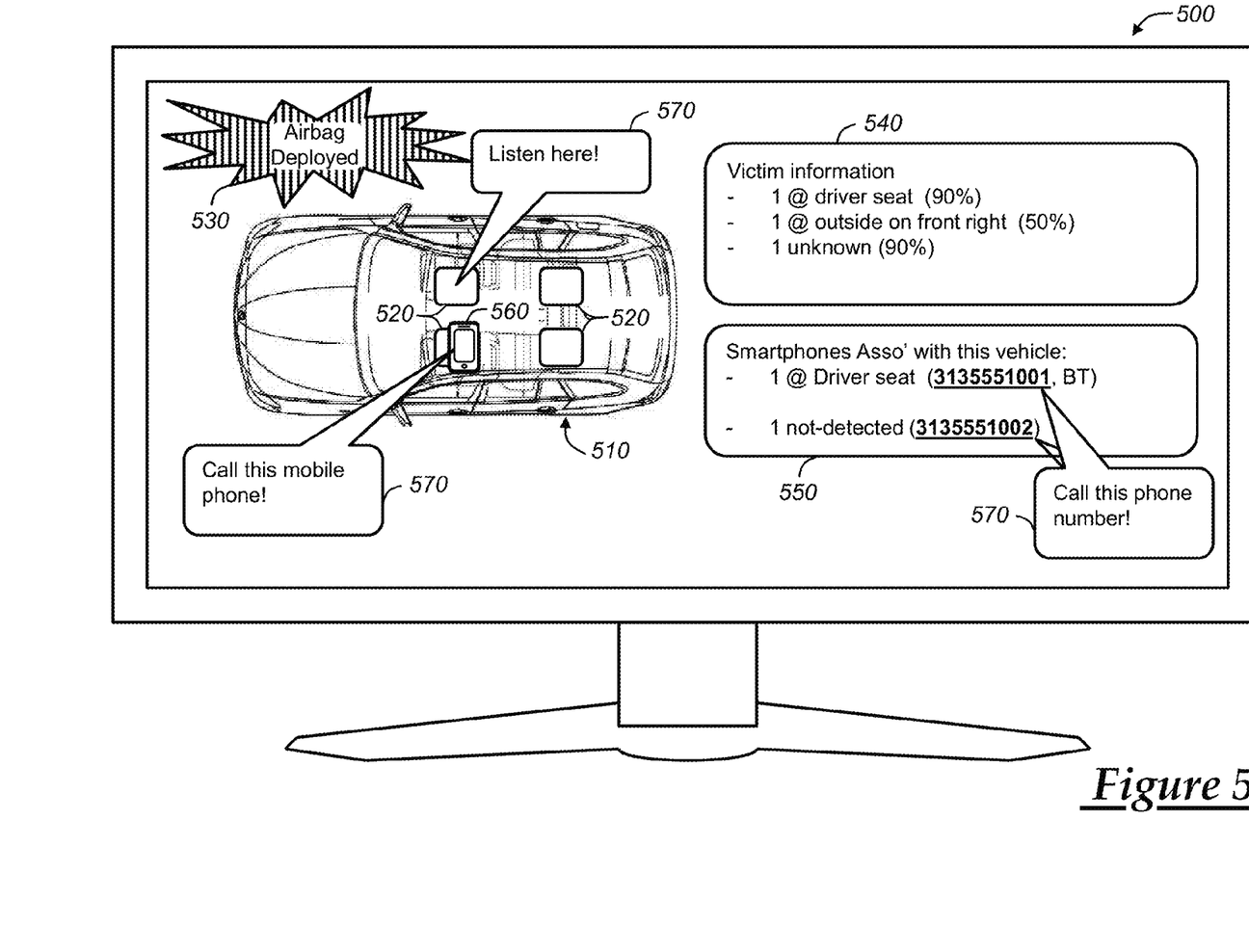
FIG. 5 illustrates an embodiment of a live advisor screen which comprises a graphical depiction of the vehicle shown in FIG. 1.

Still other embodiments exist. As discussed above, in at least one implementation, a live advisor may participate in the method(s) discussed above. In at least one embodiment (see FIG. 5), the live advisor may be presented a graphical depiction or graphical user interface (GUI) 500 (e.g., on a monitor or screen) of the vehicle and collision-related information and at least portions of the screen may be user-selectable. For example, FIG. 5 illustrates a graphical depiction of a vehicle 510 (e.g., a top view of vehicle 24) having selectable listening/communication zones 520, one or more alert notifications 530, and one or more informational portions 540-560. The vehicle depiction 510 may correspond to the vehicle make, model, and year of the actual vehicle 24 involved in a collision; and more or fewer details may be presented than those illustrated. In FIG. 5, four zones 520 are illustrated (e.g., corresponding to four passenger seats); however, this is merely an example and more or fewer zones may be displayed in other implementations. The alert notification 530 may alert or be an indication to the live advisor of an emergency or collision event. For example, in FIG. 5, the notification 530 is a notification that an airbag in vehicle 24 was deployed; however, this is merely an example. In some implementations, the notification 530 may be brightly colored (e.g., red) and/or flash or even be accompanied by audible sounds—e.g., to attract the immediate attention of the live advisor. The informational regions 540-560 may provide additional information—e.g., regarding the collision event of vehicle 24. Non-limiting examples, include: informational region 540 may provide victim information; informational region 550 may provide mobile device information; and informational region 560 may indicate a location (with respect to the vehicle) of one or more mobile devices (e.g., devices 22). In the illustrated embodiment, informational region 540 comprises textual data that one victim is located at the driver seat (90% probability), another victim is located outside the front right side of vehicle 24 (50% probability), and another victim's location is unknown (90% probability). In the illustrated embodiment, informational region 550 comprises textual data that one mobile device (e.g., 22) is at the driver seat and that another mobile device (previously connected to the VIS module 60) is no longer detected. And informational region 560 illustrates a graphical depiction of the mobile device at the driver's seat (i.e., its post-collision location). Informational region 550 further comprises textual data of the phone numbers of the respective mobile devices 22 which were connected to VIS module 60 pre-collision, as well as their post-collision connection status (e.g., mobile phone having phone number 3135551001 remains connected post-collision via Bluetooth (BT), whereas mobile phone having phone number 3135551002 is no longer detected post-collision). Displaying this and similar types of information to the live advisor at or near-real-time can enable the live advisor to make better judgments when, e.g., deciding to isolate or focus audio for communication with the vehicle occupant(s) in specific regions ($R_I$, $R_F$, $R_O$) or zones 520. Thus, the live advisor may be better able to assist the vehicle occupants in an emergency situation or post-collision. The graphical depiction 500 further may comprise additional help or suggestion bubbles 570—e.g., to alert the live advisor to potential user interface functions; however, these are not required. For example, in FIG. 5, one bubble 570 points to a zone 520 having a textual message stating "listen here!," another bubble 570 points to the mobile device which was detected post-collision (e.g., device having phone number 31355510001) having a textual message stating "call this mobile phone!," and yet another bubble 570 points to one of the information regions (e.g., 55) having a textual message stating "call this phone number!"

Thus, the graphical depiction 500 may be selectable by the live advisor to facilitate any suitable interaction with the vehicle occupant(s) (e.g., using a computer mouse (not shown), a touch screen, a keyboard, voice-activation, or any other user input device). Thus, for illustration purposes only, the live advisor could select the driver's seat zone based on a high probability that a vehicle occupant is located there (e.g., 90%) and/or based on the vehicle's detection of the mobile device's location 560 (e.g., especially where this particular mobile device was associated pre-collision with an occupant in the driver' seat). And as described above, the live advisor's selection may enable the live advisor to listen to audio in that zone without audio and/or noise from other zones—e.g., since audio from the selected zone is likely to include voice audio from the vehicle driver. Again, this may include any suitable audio focusing and/or isolating techniques—e.g., based on a remote actuation by the live advisor, the vehicle telematics unit 26, audio system 28, etc. may suppress audio in other zones or areas of the vehicle cabin, use microphone selection and/or beamforming techniques, etc. so that the live advisor can hear audio of the zone associated with the driver's seat. In other embodiments—and as described above—the live advisor may be able to remotely query the status of the VIS module 60 or even command the disconnection of a SRWC link between a mobile device 22 and the vehicle (where desirable), place a remote phone call to one or more mobile devices 22 causing the device to emit an audible sound (e.g., using the phone numbers displayed in the graphical depiction 500), use the graphical interface 500 to isolate a ringing or ringtone of the called mobile device(s), and use the identification of the mobile device's location to determine the location of the vehicle occupant post-collision, as well as speak with the vehicle occupant (e.g., whether the occupant is in the vehicle 24, outside of the vehicle 24, or partially outside of vehicle 24). Each of these inputs and outputs at the graphical user interface could be used singly or in combination with one another to determine a location of a vehicle occupant and/or isolate the audio in the area of the located occupant, as discussed in the previous embodiments above.

As described above, the graphical depiction 500 may illustrate probabilities of the location(s) of one or more vehicle occupants. In a preferred embodiment, these probabilities are determined or otherwise calculated at the vehicle 24 and communicated via cellular communication to the backend system 16 using the telematics unit 26—e.g., for display to the live advisor and/or use by automated backend system computers. Of course, other implementations are also possible—including implementations where data to perform the calculation is provided to the backend system, and computers at the backend system then perform the calculations and/or display the probabilities to the live advisor. In at least one embodiment, the location detection unit 460 (FIG. 4) computes TDOA between the microphone signals using microphone cross correlation, and peak detection. The TDOA is estimated for a sequence of speech frames. The ratio of frames for which an occupant is classified as seating in a certain location, and the total number of speech frames in the sequence, form a probability of the occupant being in that location. Of course, this is merely one implementation of determining probabilities which may be displayed to the live advisor; other implementations are also possible.

In the previously described embodiment, the live advisor views and provides input to the graphical user interface following a collision event (e.g., a post-collision state of the vehicle 24); however, the live advisor also could view a graphical depiction of the vehicle in a pre-collision state. For example, using speech audio received by cabin microphones, other vehicle sensors, and/or mobile device location information to determine vehicle occupants locations in a pre-collision state of vehicle 24.

It should be appreciated that the backend system 16 may utilize remote server(s) 18 and other computing devices at data service center 20 to provide the graphical user interface embodiment, described above. For example, remote server 18 may include one or more processors capable of executing instructions stored on server memory—and these instructions may include instructions to display information regarding one or more vehicles (e.g., such vehicle 24), at least following a collision event. For example, the instructions further may include receiving an input or command (e.g., from the live advisor) and carrying out that command. In one illustrative embodiment, the command may be a vehicle zone selection. In response to receiving the command, the command may be sent to the vehicle 24 via cellular communication, be received by the telematics unit 26, and may isolate the audio of the selected zone—e.g., including suppressing audio in other cabin zones 520. And in response, the audio of the selected zone (e.g., the vehicle occupant's speech) may be provided at the backend system 16. Other commands may be implemented as executable instructions as well—e.g., disabling the audio system 28 of the vehicle 24, calling a mobile device 22 associated with a user of the vehicle 24, etc.

Thus, there has been described a vehicle system that includes a communication device that may be used to determine location data of a vehicle user following a vehicle collision event. The communication device may monitor the location of the user prior to the collision and use the earlier determined location data as well as sensor data following the collision event, to determine the user's location following the collision event. In some implementations, a mobile device of the user may be connected to the vehicle using short range wireless communication (SRWC), and a SRWC link may be used to determine the user's location. In at least one implementation, an audible sound emitted from the mobile device may be used to determine the mobile device location following the collision event, and this location may be associated with the user's post-collision location. In addition, there has been described a backend system which can control which audio zones or regions in and/or around the vehicle. In at least one embodiment, a live advisor at the backend system may utilize a graphical user interface to view and interact with vehicle user(s).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining a location of a vehicle user following a vehicle collision event, comprising the steps of:
   associating a vehicle communication device with a mobile device associated with the user;
   receiving an indication of the vehicle collision event at the communication device;
   receiving an audio input at the communication device via one or more vehicle microphones, the audio input being associated with an audible sound emitted from the mobile device which is associated with the received indication of the vehicle collision event at the communication device; and
   determining the location of the user using the audio input.

2. The method of claim 1, wherein the associating step further comprises receiving and storing at the communication device a telephone number of the mobile device, wherein the audible sound is associated with a telephone call placed to the mobile device using the telephone number.

3. The method of claim 1, further comprising determining whether to establish voice communication between the user and a data service center via the mobile device or via a vehicle audio system based on the determined location of the user.

4. The method of claim 3, further comprising suppressing non-user cabin audio received via the one or more vehicle microphones during an established voice communication, wherein the suppression is initiated by the communication device in the vehicle or by the data service center, wherein the non-user cabin audio includes at least one of cabin noise or audio from other vehicle occupants.

5. A method of establishing communication with a vehicle user following a vehicle collision event, comprising the steps of:
receiving one or more location data inputs at a vehicle communication device in a vehicle;
using the one or more location data inputs at the communication device, determining a first location of the user;
storing location parameters associated with the first location in memory of the communication device;
receiving an indication of the vehicle collision event at the communication device;
receiving at least one additional location data input at the communication device;
in response to receiving the indication, determining a second location of the user using the stored location parameters and the at least one additional location data input; and
facilitating an establishment of a cellular communication link between a data service center and the user at the second location.

6. The method of claim 5, wherein the communication device includes a vehicle infotainment system (VIS), a vehicle telematics unit, or both.

7. The method of claim 5, wherein the one or more location data inputs and the at least one additional location data input are received from one or more of a plurality of vehicle sensors, a mobile device associated with the user, or both.

8. The method of claim 7, wherein the plurality of vehicle sensors include one or more vehicle microphones.

9. The method of claim 5, further comprising:
establishing a short range wireless communication (SRWC) link between the vehicle communication device and a mobile device associated with the user; and
during the SRWC link, determining at the communication device a mobile device telephone number associated with the mobile device,
wherein the at least one additional location data input is associated with a ringtone of the mobile device received by the communication device in response to a call placed using the mobile device telephone number.

10. The method of claim 9, wherein determining the mobile telephone number at the communication device includes receiving from the mobile device a SRWC identifier associated with the mobile device via the SRWC link, and determining the mobile device telephone number using the SRWC identifier.

11. The method of claim 9, further comprising placing the call from the data service center to the mobile device using the telephone number.

12. The method of claim 5, wherein the second location of the user is determined to be one of an in-vehicle location, an out-of-vehicle location, or a fringe location.

13. The method of claim 12, wherein, when the second location is the in-vehicle location, then further comprising determining a vehicle audio system operability check, wherein, when the audio system operability check is positive, then using one or more vehicle microphones for establishing voice communication over the cellular communication link.

14. The method of claim 12, wherein, when the second location is the fringe location, then further comprising determining whether to establish voice communication using one or more vehicle microphones or a mobile device microphone, and thereafter establishing voice communication according to the determination of whether to establish voice communication using one or more vehicle microphones or using the mobile device microphone.

15. The method of claim 12, wherein, when the second location is the out-of-vehicle location, then further comprising at least one of the following:
providing an indication to the data service center to initiate the cellular communication link with a mobile device associated with the user using a mobile device telephone number associated therewith, or
establishing the cellular communication link between the vehicle and the data service center and providing voice communication between the data service center and the mobile device via a short range wireless communication (SRWC) link between the communication device in the vehicle and the mobile device.

16. The method of claim 5, wherein once user speech is received via the established cellular communication link, suppressing non-user cabin audio, wherein the non-user cabin audio includes at least one of cabin noise or audio from other vehicle occupants using one or more vehicle microphones.

17. The method of claim 5, further comprising controlling an operation of a vehicle window to determine the second location of the user, to improve an audio quality of the cellular communication link, or both.

* * * * *